United States Patent

[15] 3,699,929

Bennethum

[45] Oct. 24, 1972

[54] ROTARY COMBUSTION ENGINE
[72] Inventor: James E. Bennethum, Rochester, Mich.
[73] Assignee: General Motors Corporation, Detroit, Mich.
[22] Filed: May 19, 1971
[21] Appl. No.: 144,728

[52] U.S. Cl..................................123/8.09, 123/8.33
[51] Int. Cl..........................F02b 53/10, F02b 53/12
[58] Field of Search..........123/8.09, 8.11, 8.13, 8.33, 123/8.35

[56] References Cited

FOREIGN PATENTS OR APPLICATIONS 1,426,036   9/1969   Germany..................123/8.33

Primary Examiner—Carlton R. Croyle
Assistant Examiner—Michael Koczo, Jr.
Attorney—J. L. Carpenter and R. L. Phillips

[57] ABSTRACT

A rotary combustion engine having a piston whose contour provides each working chamber with a trailing region that is separated from a leading region by a flow restriction for initiating combustion wherein combustion is initiated by injecting and igniting fuel-air mixture in the trailing region whereafter the flow restriction is removed to permit flow from the trailing region to the leading region for continued combustion.

6 Claims, 6 Drawing Figures

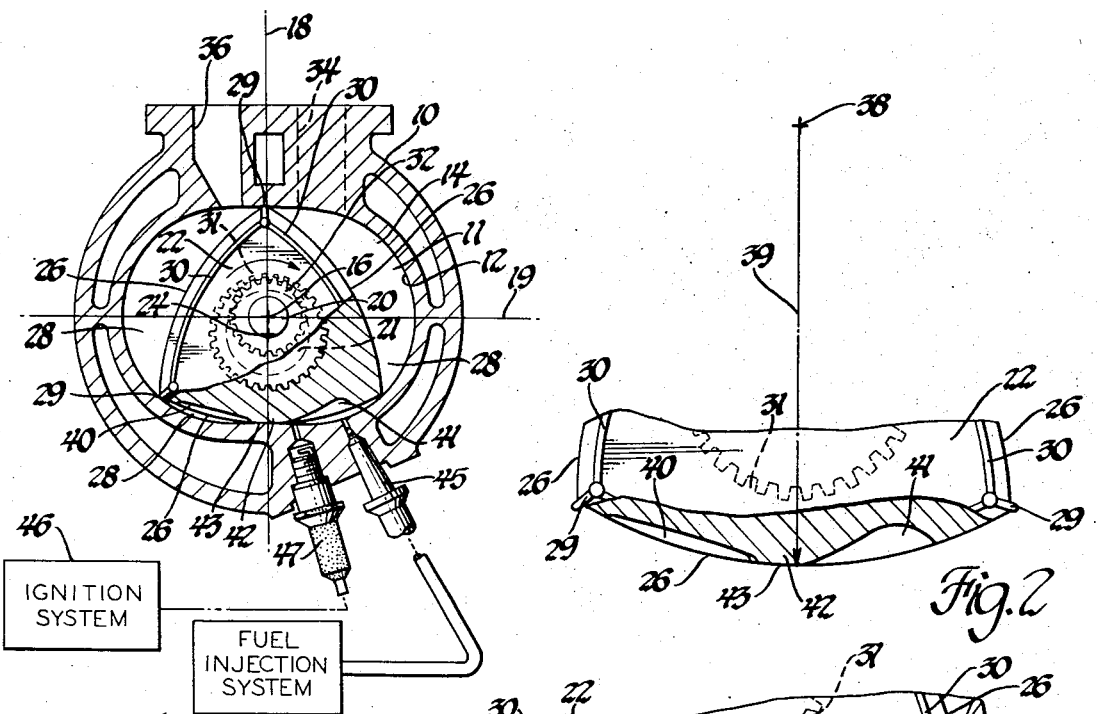
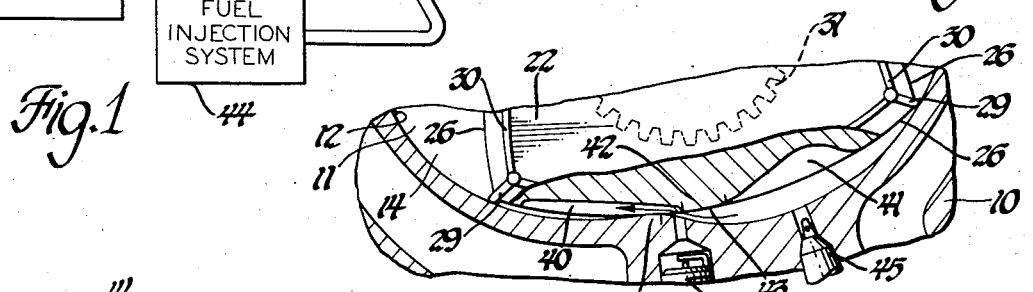
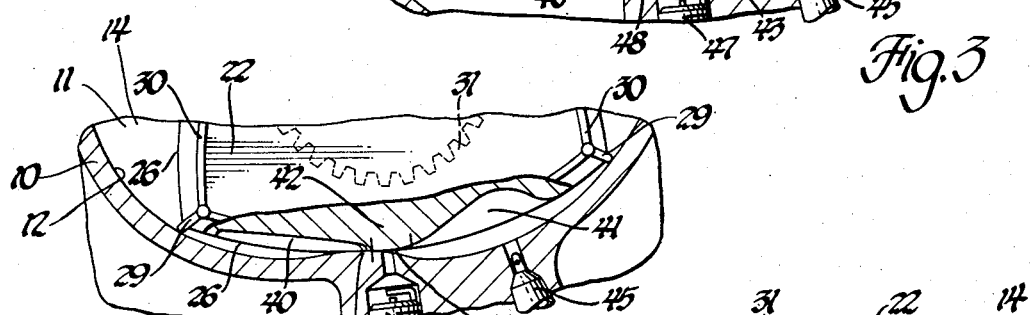
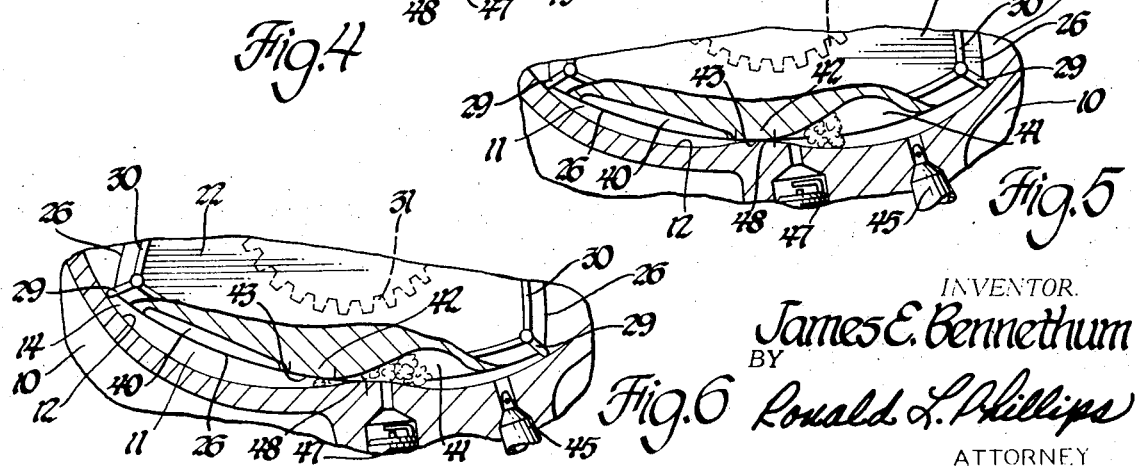

ROTARY COMBUSTION ENGINE

This invention relates to rotary combustion engines and more particularly to rotary combustion engines with precombustion.

In attempting to reduce the incomplete CO and HC products of combustion and also reduce NO production in reciprocating combustion engines, it has been proposed to separate the total engine volume into a large and small region in a certain ratio. Fuel is then introduced into the large region and ignited. The mixture which is thus initially ignited constitutes a rich air-fuel mixture that limits temperature resulting in low NO production. The incomplete products of combustion, namely CO and HC, are then passed into the fresh air in the small region where combustion continues to reduce these products to low levels. In a rotary combustion engine operating on the same cycle as a reciprocating combustion engine, it follows that such a combustion process should yield the same results. However, the structure for a reciprocating combustion engine necessary to this type of combustion process does not readily lend itself to incorporation in present commercial rotary combustion engines. Nevertheless, I have found that this combustion process can be incorporated in a present commercial rotary combustion engine by merely modifying the piston contour in a unique manner and arranging for fuel injection and ignition in a certain relation.

The rotary combustion engine according to the present invention has a housing having a piston cavity in which is disposed a piston having a plurality of faces. An output shaft is rotatably supported by the housing and has an eccentric rotatably supporting the piston. The piston is geared to the housing to provide a fixed speed ratio between the piston and the output shaft so that the output shaft is caused to rotate as the piston planetates with a fixed cyclic relationship. The piston and cavity cooperatively provide a plurality of working chambers with each working chamber provided in part by only one piston face. The chambers vary between a minimum volume and a maximum volume with an intake passage provided for directing air to each working chamber and an exhaust passage provided for directing the exhaust products therefrom. Each piston face has a contour for cooperating with the cavity to divide each working chamber when at a minimum volume into separate regions with a flow restriction therebetween and to provide for relatively unrestricted flow between these regions as each working chamber expands and contracts. A fuel injector is arranged to inject fuel into the trailing region when the only connection between these regions is by the flow restriction and an igniter is provided to ignite the fuel-air mixture in the trailing region when these regions are separated. The trailing chamber region provides a precombustion chamber to initiate combustion with the eventual flow from the trailing chamber region to the leading chamber region being primarily the products of combustion and with the flame propagating to consume the combustible mixture in the trailing chamber region prior to the availability of the compressed air in the leading chamber region for continued combustion.

An object of the present invention is to provide a new and improved rotary combustion engine.

Another object is to provide in a rotary combustion engine of the planetary piston type a working chamber that is separated into an air chamber and a precombustion chamber only during the early stage of combustion which occurs when fuel is injected and ignited in the precombustion chamber.

Another object is to provide in a rotary combustion engine of the planetary piston type a working chamber that is divided into a precombustion chamber and a smaller air chamber only during initial combustion at which time fuel is injected and ignited in the precombustion chamber and whereafter the products of combustion are then passed into the fresh air in the smaller chamber where combustion continues.

Another object is to provide in a rotary combustion engine of the planetary piston type a piston whose each working face is contoured to provide for dividing each working chamber when it is at a minimum volume into a precombustion region and an air region with a flow restriction therebetween and relatively unrestricted flow between these regions as each working chamber expands and contracts with fuel being injected and ignited in the trailing precombustion region and subsequently the products of combustion being allowed to flow from the precombustion region into the leading air region to continue combustion with the flame propagating to consume the combustible mixture in the trailing region prior to the availability of the compressed air in the leading region.

These and other objects of the present invention will become more apparent from the following description and drawing in which:

FIG. 1 is a transverse cross-sectional view of a rotary combustion engine of the planetary piston type incorporating combustion apparatus according to the present invention.

FIG. 2 is an enlarged partial view of the piston.

FIGS. 3 through 6 are enlarged partial views of the engine illustrating the sequence of events that takes place as the piston moves through top-dead-center.

Referring to FIG. 1, the combustion apparatus according to the present invention is illustrated for use in a rotary combustion engine of the planetary piston type comprising a stationary outer body or housing 10. The housing 10 provides a cavity 11 that is defined by an inwardly facing peripheral wall 12 and a pair of axially spaced side walls 14 of which only one is shown. The peripheral wall 12 is in the shape of a two-lobed epitrochoid or a curve parallel thereto whose center or axis is indicated at 16 where the curve's minor axis 18 and major axis 19 intersect. A power output shaft 20 extends through the cavity 11 and is rotatably supported by the housing 10 in the end walls 14 so that the shaft's axis is coincident with the axis 16 of the peripheral wall 12.

The power output shaft 20 is provided in the cavity 11 with an eccentric 21 on which a rotor or piston 22 is mounted for rotation about the eccentric's axis 24, this axis being spaced from and parallel to the power output shaft's axis 16. Piston 22 has the shape of a triangle whose faces 26 are convex and face the peripheral wall 12 and cooperate therewith to define three variable volume working chambers 28. The piston's general outline corresponds to the three-lobed inner envelope of the two-lobed epitrochoid peripheral wall 12. An apex seal 29 is mounted at each apex or corner of the piston 22 and a side seal 30 is arranged to extend between each set of adjacent apex seals 29. The apex seals 29 and side seals 30 continuously engage the peripheral wall 12 and the side walls 14, respectively, with the complete seal arrangement acting to seal the working chambers 28. With the two-lobed peripheral wall 12 and the three-lobed piston 22 there are provided the four phases of intake, compression, expansion and exhaust in fixed relation to the housing by forcing the piston to rotate at one-third the speed of the output shaft. This is accomplished by a gear train comprising an internally toothed ring gear 31 that is fixed to the piston 22 concentric with the piston axis 24. Ring gear 31 meshes with an externally toothed gear 32 which is concentric with the power output shaft axis 16 and is made stationary by being fixed to the engine housing 10. The ring gear 31 has one and one-half times the number of teeth as the gear 32 to provide the required speed ratio of 3:1 between the power output shaft 20 and piston 22. Air is made available to each working chamber by an intake passage 34 that extends through the housing 10 and intersects with the cavity 11 to one side of and near the minor axis 18 and one side of the major axis 19. The exhaust products of combustion are exhausted from each working chamber 28 by an exhaust passage 36 which extends through the housing 10 to the cavity 11 on the same side of the major axis 19 as intake passage 34 but on the opposite side of and near the minor axis 18 as shown in FIG. 1.

The engine construction thus far described is conventional. In present commercial engines, the piston faces normally have a constant radius and a single channel or depression so that the working chamber is not separated at the time of combustion. Typically, such engines have each of the three working chambers undergoing intake, compression, expansion and exhaust with a single piston arrangement as shown providing a power phase for each revolution of the engine's output shaft. Typically, in carbureted engines and as the piston rotates in the direction of the arrow in FIG. 1, a gas mixture containing the fuel is drawn through the intake passage into each working chamber after which the inlet passage is closed to this working chamber by the trailing apex seal. The mixture in the working chamber is then compressed and when the piston is at top-dead-center (TDC) as shown in FIG. 1 or near thereto, ignition of the mixture is caused to take place. The peripheral wall takes the reaction forcing the piston to continue rotation while the gas is expanding. Eventually the leading apex seal passes the exhaust passage so that the burned-gas mixture in this working chamber is expelled to the atmosphere to complete the cycle. It is also known to intake air rather than a gas mixture and later inject the fuel at or near TDC and ignite such fuel.

According to the present invention as shown in FIG. 2, each piston face 26, instead of normally following the circumference of a circle having a center 38 and a radius 39 and being provided with the normal channel has a pair of cavities or depressions 40 and 41 that are separated by a wall section 42. The cavities and wall section extend axially from one piston side to the other with only the periphery or land 43 of wall section 42 having the fixed radius 39 and the cavities 40 and 41 having smaller and varying radii. The cavity 40 with the given piston turning direction may be said to lead the other cavity 41 and therefore these cavities may be referred to as the leading cavity and trailing cavity, respectively. In the embodiment shown, the cavity 40 has a relatively constant depth while the cavity 41 progressively increases in depth as it extends from the wall 42 toward the trailing apex seal and as it nears this seal, it rapidly decreases in depth with the result being that while the cavities 40 and 41 have approximately the same circumferential length, the cavity 41 has a substantially larger volume than that of cavity 40 for reasons which will become more apparent later.

Referring to FIGS. 1 and 3 – 6, there is provided a fuel injection system 44 having an injector 45 which is mounted in the housing 10 on the same side of the minor axis 18 as intake passage 34 but on the opposite side of the major axis 19 in a position to provide for fuel flow into the oncoming air in the trailing cavity 41 of each working chamber as TDC is approached to provide fuel-air mixing. The fuel injection system 44 may be of any suitable known type that is timed to provide fuel injection in accordance with the operation described later. There is also provided an ignition system 46 having a spark plug 47 which is mounted in the housing 10 intermediate the injector 45 and the minor axis 18 so that it is available to each trailing cavity 41 as TDC is approached. The ignition system may be of any suitable known type that is timed to provide ignition of the air-fuel mixture in accordance with the operation that will now be described.

Describing now the operation of the engine with the combustion apparatus according to the present invention, reference is made to FIGS. 3 through 6 which show the sequence of events that takes place as the piston moves through TDC. In FIG. 3, the piston 22 is providing compression with the leading cavity 40 providing a passage as shown by the arrow from the trailing cavity 41 to the leading cavity past the waist or cusp 48 at the minor axis 18 on the combustion side of the peripheral wall 12. This passage provides for only a low pressure drop as the air flows in the direction of the arrow until the land 43 reaches the cusp 48 at which time the cavities 40 and 41 are separated to thus separate the working chamber into a leading chamber region and a trailing chamber region as shown in FIG. 4. The fuel injection system 44 is timed to provide fuel injection by the injector 45 into the trailing chamber region 41 of the working chamber as the piston rotates from the FIG. 3 position to the FIG. 4 position with sufficient time for mixing of the fuel with the air while assuring that no fuel reaches the cusp 48 before land 43 reaches this cusp to thereafter keep the fuel from passing into leading chamber region 40. With continued piston rotation, the piston reaches the TDC position shown in FIG. 5. The ignition system 46 is timed so that the spark plug 47 ignites the air-fuel mixture that is in the trailing chamber region 41 between the piston positions shown in FIGS. 4 and 5 and with sufficient advance to assure completion of burning near the land 43 before the piston reaches the position shown in FIG. 6 in which condition the trailing chamber region 41 is then connected past the cusp 48 to the leading chamber region 40. Then the products of combustion move into the fresh air in the leading chamber region 40 where the combustion of the unburned products continues toward completion. Concerning the relative sizes of the cavities 40 and 41 it may be desirable to separate each working chamber into two parts in the ratio of 65 percent and 35 percent as proposed for reciprocating combustion engines. To accomplish this, the volumes of the cavities 40 and 41 are proportioned according to this ratio with the leading cavity 40 thus providing one-third of the working chamber and the larger trailing cavity 41 being twice as large to provide the remaining two-thirds of the working chamber.

Thus, the combustion apparatus according to the present invention operates by the leading cavity 40 acting as a flow passage to allow air to pass from the trailing cavity 41 to the leading cavity 40 during compression with the land 43 serving as a restriction between these cavities to keep the fuel from entering the leading cavity during fuel injection and initiation of combustion. The trailing cavity 41 serves as a precombustion chamber into which the fuel is injected and ignited in the presence of about two-thirds of the total air supply.

Thus it can be seen that the combustion apparatus according to the present invention can be readily incorporated in known rotary combustion planetary piston type engines permitting the total working chamber volume to remain a normal size to provide a normal compression ratio which presently is about 9:1. It is also readily apparent that the volume ratio of the two cavities may be varied to obtain with a certain fuel minimum incomplete CO and HC products of combustion and also minimum NO production.

The above described embodiment is illustrative of the invention which may be modified within the scope of the appended claims.

I claim:

1. A rotary combustion engine comprising a housing having a cavity, a piston disposed in said cavity having a plurality of faces, an output shaft rotatably supported by said housing and having an eccentric rotatably supporting said piston, means for providing a fixed speed ratio between said piston and said output shaft whereby said output shaft is caused to rotate as said piston planetates with a fixed cyclic relationship, said piston and cavity cooperatively providing a plurality of working chambers with each said working chamber provided in part by only one piston face and varying between a minimum volume and a maximum volume, intake passage means for directing air to each said working chamber, exhaust passage means for directing exhaust products from each said working chamber, each said piston face having a contour for cooperating with said cavity to divide each said working chamber when at minimum volume into separate regions with a flow restriction therebetween and relatively unrestricted flow between said regions as each said working chamber contracts and wherein one chamber region leads the other chamber region as said piston rotates, fuel injector means for injecting fuel into said trailing chamber region when said regions are separated by said flow restriction, and igniter means for igniting the air-fuel mixture in said trailing chamber region when said regions are separated by said flow restriction whereby the trailing chamber region provides a precombustion chamber into which the fuel is injected and ignited and the eventual flow from the trailing chamber region to the leading chamber region is primarily the products of combustion with the flame propagating to consume the combustible mixture in the trailing chamber region prior to the availability of the compressed air in the leading chamber region for continued combustion.

2. A rotary combustion engine comprising a housing having a cavity, a piston disposed in said cavity having a plurality of faces, an output shaft rotatably supported by said housing and having an eccentric rotatably supporting said piston, means for providing a fixed speed ratio between said piston and said output shaft whereby said output shaft is caused to rotate as said piston planetates with a fixed cyclic relationship, said piston and cavity cooperatively providing a plurality of working chambers with each said working chamber provided in part by only one piston face and varying between a minimum volume and a maximum volume, intake passage means for directing air to each said working chamber, exhaust passage means for directing exhaust products from each said working chamber, each said piston face having a contour for cooperating with said cavity to divide each said working chamber when at minimum volume into a large volume region and a small volume region with a flow restriction therebetween and relatively unrestricted flow between said regions as each said working chamber contracts and wherein said small volume chamber region leads said large volume chamber region as said piston rotates, fuel injector means for injecting fuel into the trailing large volume region when said regions are separated by said flow restriction, and igniter means for igniting the air-fuel mixture in the trailing large volume chamber region when said regions are separated by said flow restriction whereby the trailing large volume chamber region provides a precombustion chamber into which the fuel is injected and ignited and the eventual flow from the trailing large volume chamber region to the leading small volume chamber region is primarily the products of combustion with the flame propagating to consume the combustible mixture in the trailing large volume chamber region prior to the availability of the compressed air in the leading small volume chamber region for continued combustion.

3. A rotary combustion engine comprising a housing having a piston cavity, said piston cavity having a multi-lobed peripheral wall with multi-cusps, a piston disposed in said piston cavity having a plurality of faces facing said peripheral wall, an output shaft rotatably supported by said housing and having an eccentric rotatably supporting said piston, means for providing a fixed speed ratio between said piston and said output shaft whereby said output shaft is caused to rotate as said piston planetates with a fixed cyclic relationship, said piston and piston cavity cooperatively providing a plurality of working chambers with each said working chamber provided in part by said peripheral wall and only one piston face and varying between a minimum volume at said cusps and a maximum volume intermediate said cusps, intake passage means for directing air to each said working chamber, exhaust passage means for directing exhaust products from each said working chamber, each said piston face having two cavities of different volume separated by a wall section for cooperating with said peripheral wall to divide each said working chamber when at minimum volume into separate regions of unequal volume with a flow restriction therebetween provided by said piston wall section cooperating with one of said cusps and to permit relatively unrestricted flow between said regions as each said working chamber contracts and wherein the small cavity leads the large cavity as said piston rotates, fuel injector means for injecting fuel into said large cavity when said regions are separated by said flow restriction, and igniter means for igniting the fuel in said large cavity when said chamber regions are separated by said flow restriction whereby the trailing chamber region provides a precombustion chamber into which the fuel is injected and ignited and the eventual flow from the trailing chamber region to the leading chamber region is primarily the products of combustion with the flame propagating to consume the combustible mixture in the trailing chamber region prior to the availability of the compressed air in the leading chamber region for continued combustion.

4. A rotary combustion engine comprising a housing having a piston cavity, said piston cavity having a peripheral wall having basically the profile of a two-lobed epitrochoid with two cusps, a piston disposed in said piston cavity having basically the profile of a triangle with three faces facing said peripheral wall, an output shaft rotatably supported by said housing and having an eccentric rotatably supporting said piston, means for providing a fixed speed ratio between said piston and said output shaft whereby said output shaft is caused to rotate as said piston planetates with a fixed cyclic relationship of three output shaft revolutions for every one piston revolution, said piston and piston cavity cooperatively providing three working chambers with each said working chamber provided in part by said peripheral wall and only one piston face and varying between a minimum volume at said cusps and a maximum volume intermediate said cusps, intake passage means for directing air to each said working chamber, exhaust passage means for directing exhaust products from each said working chamber, each said piston face having a small cavity and a large cavity with a dividing wall therebetween for cooperating with said peripheral wall at one of said cusps to divide each said working chamber when at minimum volume into a large volume chamber region and a small volume chamber region with a flow restriction therebetween provided by said dividing wall cooperating with said one cusp and to permit relatively unrestricted flow between said regions via said small cavity as each said working chamber contracts and wherein said small volume chamber region leads said large volume chamber region as said piston rotates, fuel injector means connected to said cavity at one side of said one cusp for injecting fuel into said large volume chamber region provided by said large cavity when said regions are separated by said flow restriction, and igniter means connected to said cavity at one side of said one cusp for igniting the fuel in said large volume chamber region when said regions are separated by said flow restriction.

5. A rotary combustion engine comprising a housing having a cavity, said cavity having a peripheral wall having basically the profile of a two-lobed epitrochoid with two cusps, a piston disposed in said cavity having basically the profile of a triangle with faces facing said peripheral wall, an output shaft rotatably supported by said housing and having an eccentric rotatably supporting said piston, means for providing a fixed speed ratio between said piston and said output shaft whereby said output shaft is caused to rotate as said piston planetates with a fixed cyclic relationship of three output shaft revolutions for every one piston revolution, said piston and cavity cooperatively providing three working chambers with each said working chamber provided in part by said peripheral wall and only one piston face and varying between a minimum volume at said cusps and a maximum volume, intake passage means connected to said cavity at one side of one of said cusps for directing air to each said working chamber, exhaust passage means connected to said cavity at the other side of said one cusp for directing exhaust products from each said working chamber, each said working chamber being divided when at minimum volume into separate regions by the other of said cusps and an intermediate portion of each piston face and wherein one chamber region leads the other chamber region as said piston rotates, fuel injector means connected to said cavity at one side of said other cusp for injecting fuel into the trailing chamber region when said regions are separated, and igniter means connected to said cavity at said one side of said other cusp for igniting the air-fuel mixture in the trailing chamber region when said regions are separated whereby the trailing chamber region provides a precombustion chamber into which the fuel is injected and ignited and the eventual flow from the trailing chamber region to the leading chamber region is primarily the products of combustion with the flame propagating to consume the combustible mixture in the trailing chamber region prior to the availability of the compressed air in the leading chamber region for continued combustion.

6. A rotary combustion engine comprising a housing having a cavity, a piston disposed in said cavity having a plurality of faces, an output shaft rotatably supported by said housing and having an eccentric rotatably supporting said piston, means for providing a fixed speed ratio between said piston and said output shaft whereby said output shaft is caused to rotate as said piston planetates with a fixed cyclic relationship, said piston and cavity cooperatively providing a plurality of working chambers with each said working chamber provided in part by only one piston face and varying between a minimum volume and a maximum volume, air delivery means for delivering air to each said working chamber, fuel delivery means for delivering fuel to each said working chamber, exhaust means for delivering exhaust products from each said working chamber, each said piston face having a contour for cooperating with said cavity to divide each said working chamber when at minimum volume into separate regions with a flow restriction therebetween and relatively unrestricted flow between said regions as each said working chamber contracts and wherein one chamber region leads the other chamber region as said piston rotates, and igniter means for igniting the air-fuel mixture in said trailing chamber region when said regions are separated by said flow restriction whereby the trailing chamber region provides a precombustion chamber in which the fuel is ignited and the eventual flow from the trailing chamber region to the leading chamber region is primarily the products of combustion with the flame propagating to consume the combustible mixture in the trailing chamber region prior to the availability of the remaining matter in the leading chamber region for continued combustion.

* * * * *